US012212106B1

(12) United States Patent
Tan

(10) Patent No.: US 12,212,106 B1
(45) Date of Patent: Jan. 28, 2025

(54) CONNECTOR AND DATA CABLE

(71) Applicant: Dongguan Youhechuang Electronic Technology Co., Ltd., Dongguan (CN)

(72) Inventor: Hongping Tan, Dongguan (CN)

(73) Assignee: Dongguan Youhechuang Electronic Technology Co., Ltd., Dongguan (CN)

( * ) Notice: Subject to any disclaimer, the term of this patent is extended or adjusted under 35 U.S.C. 154(b) by 0 days.

(21) Appl. No.: 18/648,487

(22) Filed: Apr. 29, 2024

(51) Int. Cl.
*H01R 39/00* (2006.01)
*H01R 35/04* (2006.01)

(52) U.S. Cl.
CPC .................................... *H01R 35/04* (2013.01)

(58) Field of Classification Search
CPC ...................................................... H01R 35/04
USPC ............................................................ 439/31
See application file for complete search history.

(56) References Cited

U.S. PATENT DOCUMENTS

| | | | | | |
|---|---|---|---|---|---|
| 5,860,824 | A * | 1/1999 | Fan | B60R 11/0241 | 439/669 |
| 6,786,734 | B2 * | 9/2004 | Yu | H01R 35/02 | 439/31 |
| 7,026,560 | B2 * | 4/2006 | Terhune | H01R 35/04 | 200/51 R |
| 7,121,852 | B2 * | 10/2006 | Ng | H01R 35/04 | 439/31 |
| 7,128,615 | B1 * | 10/2006 | Liao | H01R 35/04 | 439/640 |
| 7,172,428 | B2 * | 2/2007 | Huang | H01R 35/00 | 439/31 |
| 7,614,903 | B1 * | 11/2009 | Huang | H01R 13/5841 | 439/446 |
| 7,670,190 | B2 * | 3/2010 | Shi | H01R 24/58 | 439/640 |
| 7,811,136 | B1 * | 10/2010 | Hsieh | H01R 24/60 | 439/31 |
| 8,371,872 | B2 * | 2/2013 | Zhou | H01R 35/02 | 439/446 |
| 8,500,492 | B2 * | 8/2013 | Brown | H01R 31/005 | 439/638 |
| 8,651,874 | B2 * | 2/2014 | Ku | H01R 35/02 | 439/31 |
| 8,777,671 | B2 * | 7/2014 | Huang | H01R 35/04 | 439/11 |

(Continued)

*Primary Examiner* — Abdullah A Riyami
*Assistant Examiner* — Vladimir Imas
(74) *Attorney, Agent, or Firm* — Andrew C. Cheng

(57) ABSTRACT

A connector and a data cable are provided, the connector includes a first and second electrical connection structure that can be relatively rotated and electrically connected. The first electrical connection structure includes an electrical connection body and a fixing portion, and the electrical connection body includes a plug and a first conductive board. The fixing portion includes a connecting member and a sleeve member, and the sleeve member is sleeved to the first and second electrical connection structure. At least the second electrical connection structure is rotatably connected to the sleeve member. The connecting member is at least partially accommodated in the sleeve member, which increases the stability and safety thereof, prevent the loosening of components due to frequent rotation or bending of the connector, reduces the likelihood of accidental disconnection, minimizes the risk of connector damage, and facilitates the installation and assembly process of the connector.

18 Claims, 7 Drawing Sheets

(56) References Cited

U.S. PATENT DOCUMENTS

| | | | | |
|---|---|---|---|---|
| 8,801,465 | B2 * | 8/2014 | Yeh | H01R 24/66<br>439/76.1 |
| 8,944,853 | B2 * | 2/2015 | Liao | H01R 13/4538<br>439/660 |
| 8,979,549 | B2 * | 3/2015 | Lin | H01R 13/46<br>439/31 |
| 9,979,146 | B2 * | 5/2018 | Vishwanath | H01R 13/46 |
| 11,101,584 | B2 * | 8/2021 | Tan | H01R 35/04 |
| 2008/0227338 | A1 * | 9/2008 | Lin | H01R 31/06<br>439/640 |
| 2013/0094172 | A1 * | 4/2013 | Hiroki | B60R 16/027<br>361/827 |
| 2019/0363498 | A1 * | 11/2019 | Cox | B25J 19/0029 |
| 2021/0226395 | A1 * | 7/2021 | Loske | H01R 25/003 |

* cited by examiner

CONNECTOR AND DATA CABLE

TECHNICAL FIELD

The present disclosure relates to the field of electrical connection, and in particular to a connector and a data cable.

BACKGROUND OF THE INVENTION

A variety of portable electronic devices have enhanced convenience for individuals, yet the longevity of their batteries has emerged as a prevalent issue among users. To cater to the diverse usage scenarios of these devices, data cables with rotational capabilities have been introduced. Nevertheless, the current designs of these data cables with rotation features exhibit suboptimal reliability. With repeated rotations and extensive use, the structural integrity of these cables may deteriorate, leading to compromised data transmission.

SUMMARY OF THE INVENTION

In order to solve the problem of looseness between the structures of data cables in the existing art, the present disclosure provides a connector and a data cable.

To address the technical problems above, one embodiment of the present disclosure provides a connector, including a first electrical connection structure and a second electrical connection structure that can be relatively rotated and electrically connected; where the first electrical connection structure includes an electrical connection body and a fixing portion; the electrical connection body includes a plug and a first conductive board that are electrically connected; the fixing portion includes a connecting member and a sleeve member, the first conductive board is disposed in the connecting member, the connecting member is exposed out of the plug, and the sleeve member is sleeved to the first electrical connection structure and the second electrical connection structure; at least the second electrical connection structure is rotatably connected to the sleeve member, and the connecting member is at least partially accommodated in the sleeve member.

Preferably, the connecting member includes a wrapping portion that at least partially wraps around the plug and a docking portion located at one side of the wrapping portion away from the plug; a discontinuous gap is provided between the wrapping portion and one end of the docking portion close the wrapping portion; a hooking portion is provided at one end of the sleeve member facing the connecting member, and an interior of the hooking portion is provided with a inverted hook; when the connecting member is connected to the sleeve member, the hooking portion wraps around the docking portion, and the inverted hook enters the gap.

Preferably, an edge of the first conductive board is provided with a glue-receiving notch, a glue-receiving space is formed between the glue-receiving notch and an inner wall of the fixing portion, and the gap is communicated with the glue-receiving notch.

Preferably, an inner wall of one end of the fixing portion away from the plug is provided with an annular groove, and a protrusion matching the annular groove is disposed at one end of the second electrical connection structure close to the first electrical connection structure; the protrusion cooperates with the annular groove to achieve rotational connection therebetween; at least one set of limiting structures is disposed corresponding to the annular groove and the protrusion, and the limiting structure is configured to control the relative rotation angle between the first electrical connection structure and the second electrical connection structure to be any angle between 0° and 360°.

Preferably, the limiting structure is configured to control the relative rotation angle between the first electrical connection structure and the second electrical connection structure to be one of 90°, 120°, 180°, or 270°.

Preferably, one end of the plug connected to the wrapping portion is provided with a flipping structure.

Preferably, a support plate and a metal spring piece are provided on one side of the first conductive board away from the plug, and the support plate is provided with a through hole, from which the metal spring piece extends, corresponding to the metal spring piece.

Preferably, the second electrical connection structure includes a rotating portion, and the rotating portion includes a housing provided with the protrusion, a second conductive board provided in the housing and an elastic terminal electrically connected to one side of the second conductive board away from the first electrical connection structure.

Preferably, the elastic terminals are arranged in two opposite groups, each group thereof including at least 6 elastic terminals, and the elastic terminals in a same group includes at least a charging terminal, a data terminal, and/or a signal terminal.

Preferably, the second electrical connection structure further includes a plastic member disposed at one side of the second conductive board facing the elastic terminal, and the elastic terminals in a same group are fixedly connected to the second conductive board through a same plastic member.

Preferably, spacer blocks are provided in the housing, and spacer gaps are formed between adjacent spacer blocks; one end of the elastic terminals away from the second conductive board respectively extends into corresponding spacer gaps.

Preferably, the second electrical connection structure further includes a connecting base and an adapter plate disposed on the connecting base, a plugging space is formed between two groups of elastic terminals, and the adapter plate is inserted into the plugging space to be electrically connected to the elastic terminals.

Preferably, the elastic terminal is provided with a contact and electrically connected to the adapter plate through the contact, and the contacts of the elastic terminals in a same group are located on concentric circles.

Preferably, the elastic terminal includes a bending section, the contact is disposed at the bending section, and the contacts of different types of elastic terminals in a same group have different heights in a direction perpendicular to the second conductive board.

Preferably, the connecting base is provided with a clamping plate, which includes clamping arms arranged on opposite sides in a thickness direction of the adapter plate and a rotating shaft connecting the clamping arms, the adapter plate and the cover; the connecting base is rotatably connected to the rotating portion through the rotating shaft, and a plane in which a rotation direction of the connecting base and the rotating portion is located and a plane in which the first electrical connection structure and the second electrical connection structure rotate relative to each other are different planes in a same space.

Preferably, giving-way steps and giving-way holes are provided on both sides of the housing, and a support boss is disposed on the giving-way step; two ends of the rotating shaft pass through the giving-way holes to connect the adapter plate and the clamping arm, and the support boss abut against a top of the clamping arm.

To address the technical problems above, another embodiment of the present disclosure provides a data cable including a wire body and a connector, where the connector includes a first electrical connection structure and a second electrical connection structure that can relatively rotated and electrically connected; the first electrical connection structure includes an electrical connection body and a fixing portion, the electrical connection body includes a plug and a first conductive board that are electrically connected; the fixing portion includes a connecting member and a sleeve member, the first conductive board is disposed in the connecting member, the connecting member is exposed out of the plug, and the sleeve member is sleeved to the first electrical connection structure and the second electrical connection structure; at least the second electrical connection structure is rotatably connected to the sleeve member, and the connecting member is at least partially accommodated in the sleeve member; the wire body is electrically connected to one or both of the first electrical connection structure and the second electrical connection structure.

Preferably, the connecting member includes a wrapping portion that at least partially wraps around the plug and a docking portion located at one side of the wrapping portion away from the plug; a discontinuous gap is provided between the wrapping portion and one end of the docking portion close the wrapping portion; a hooking portion is provided at one end of the sleeve member facing the connecting member, and an interior of the hooking portion is provided with a inverted hook; when the connecting member is connected to the sleeve member, the hooking portion wraps around the docking portion, and the inverted hook enters the gap.

Preferably, an edge of the first conductive board is provided with a glue-receiving notch, a glue-receiving space is formed between the glue-receiving notch and an inner wall of the fixing portion, and the gap is communicated with the glue-receiving notch.

Preferably, an inner wall of one end of the fixing portion away from the plug is provided with an annular groove, and a protrusion matching the annular groove is disposed at one end of the second electrical connection structure close to the first electrical connection structure; the protrusion cooperates with the annular groove to achieve rotational connection therebetween; at least one set of limiting structures is disposed corresponding to the annular groove and the protrusion, and the limiting structure is configured to control the relative rotation angle between the first electrical connection structure and the second electrical connection structure to be one of 90°, 120°, 180°, or 270°.

In comparison to prior art, the connector and data cable of the present disclosure offers several advantageous features.

The connector provided in one embodiment of the present disclosure includes a first electrical connection structure and a second electrical connection structure that can relatively rotated and are electrically connected, making the use of the connector more flexible and adaptable to diverse usage environments. At the same time, the connector can withstand frequent connection and disconnection operations, increasing its durability and extending its service life. The first electrical connection structure includes an electrical connection body and a fixing portion; the electrical connection body includes a plug and a first conductive board that are electrically connected; the fixing portion includes a connecting member and a sleeve member, the first conductive board is disposed in the connecting member, and the connecting member is exposed out of the plug. The fixing portion is used to fix the electrical connection body and protect the first conductive board and other structures. One end of the plug is electrically connected to the first conductive board, and the other end thereof exposes the connecting member for connecting with electronic devices to achieve data transmission, charging, and other operations, which provides reliable electrical connection and ensures the stability and efficiency of data or power transmission. The sleeve member is sleeved to the first electrical connection structure and the second electrical connection structure, and at least the second electrical connection structure is rotatably connected to the sleeve member. With this design, the connection between the first electrical connection structure and the second electrical connection structure is stable and not easily separated, while achieving a 360° rotation therebetween. The connecting member is at least partially accommodated in the sleeve member, which increases the stability and safety of the connection between the two, avoids the loosening of various components after frequent rotation or multiple bending of the connector, prevent accidental loosening or disconnection, reduce the risk of connector damage, and make the installation and assembly of the connector more convenient.

In another embodiment of the present disclosure, a data cable is provided, including a wire body and a connector, where the connector includes a first electrical connection structure and a second electrical connection structure that can relatively rotated and electrically connected; the first electrical connection structure includes an electrical connection body and a fixing portion, the electrical connection body includes a plug and a first conductive board that are electrically connected; the fixing portion includes a connecting member and a sleeve member, the first conductive board is disposed in the connecting member, the connecting member is exposed out of the plug, and the sleeve member is sleeved to the first electrical connection structure and the second electrical connection structure; at least the second electrical connection structure is rotatably connected to the sleeve member, and the connecting member is at least partially accommodated in the sleeve member; the wire body is electrically connected to one or both of the first electrical connection structure and the second electrical connection structure. The data cable has the same beneficial effect as the connector above, and will not be further elaborated here.

BRIEF DESCRIPTION OF DRAWINGS

In order to more clearly illustrate the technical solutions of the embodiments of the present disclosure, the drawings needed to be used in the description of the embodiments will be briefly introduced below. Obviously, the drawings in the following description are some embodiments of the present disclosure. Those of ordinary skill in the art can also obtain other drawings based on these drawings without exerting creative work.

Figure 1:
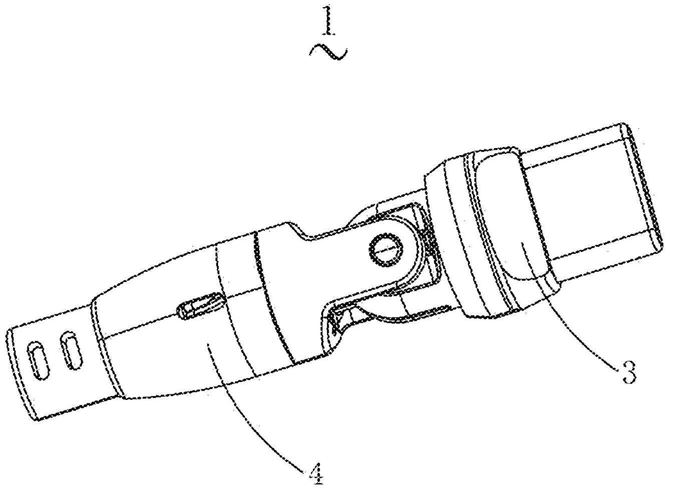
FIG. 1 is a perspective view of a connector provided by a first embodiment of the present disclosure.

In the drawings, the parts represented by each number are listed as follows:

1. connector; 2. data cable; 3. first electrical connection structure; 4. second electrical connection structure; 5. limiting structure;

20. wire body; 30. electrical connection body; 31. fixing portion; 40. rotating portion; 41. connecting base; 42. adapter plate; 50. limiting protrusion; 51. limiting groove;

300. plug; 301. first conductive board; 310. connecting member; 311. sleeve member; 312. annular groove; 400. housing; 401. second conductive board; 402. plastic member; 403. elastic terminal; 404, plugging space; 410, clamping plate; 420, contact circuit;

3000. flipping structure; 3010. glue-receiving notch; 3011. support plate; 3012. through hole; 3013. metal spring piece; 3100. wrapping portion; 3101. docking portion; 3102. gap; 3110. hooking portion; 3111. inverted hook; 4000, protrusion; 4001, spacer block; 4002, spacer gap; 4003, giving-way step; 4004, support boss; 4005, giving-way hole; 4030, bending section; 4031, contact; 4032, charging terminal; 4033, data terminal; 4034, signal terminal; 4100, clamping arm; 4101, rotating shaft; 4200, first annular contact circuit; 4201, second annular contact circuit; 4202, third annular contact circuit;

40320, charging-terminal contact; 40330, data-terminal contact; 40340, signal-terminal contact.

DETAILED DESCRIPTION OF THE INVENTION

The technical solutions in the embodiments of the present disclosure will be clearly and completely described below with reference to the accompanying drawings in the embodiments of the present disclosure. Obviously, the described embodiments are part of the embodiments of the present disclosure, rather than all of the embodiments. Based on the embodiments in the present disclosure, all other embodiments obtained by those of ordinary skill in the art without creative efforts fall within the scope of protection of the present disclosure.

It should be noted that when an element is referred to as being "fixed" to another element, it can be directly on the other element or intervening elements may also be present. When an element is referred to be "connected" to another element, it can be directly connected to the other element or there may also be intervening elements present. The terms "vertical," "horizontal," "left," "right," and similar expressions are used herein for illustrative purposes only.

Figure 2:
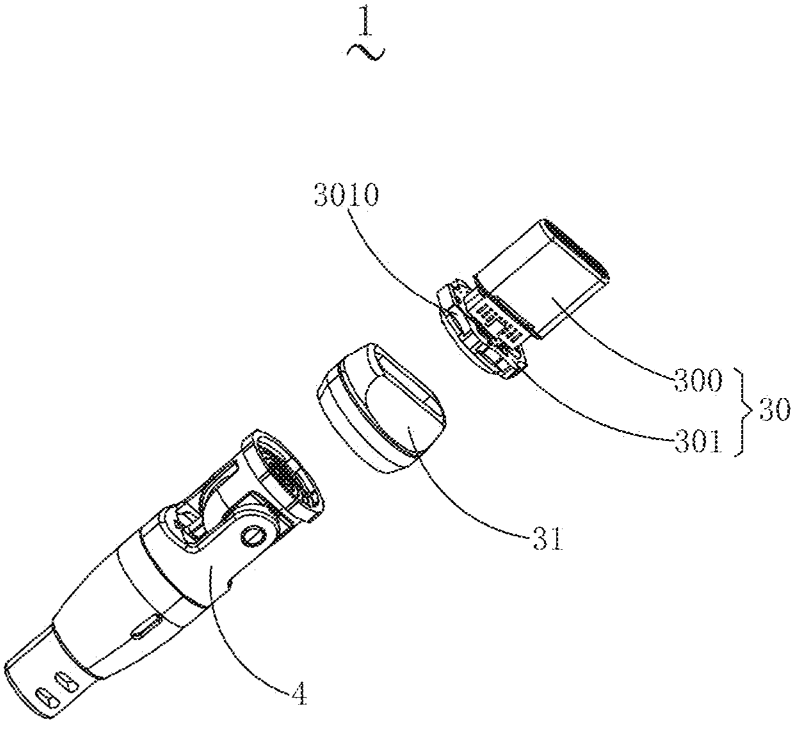
FIG. 2 is an exploded view of the connector provided by the first embodiment of the present disclosure.
Figure 3:
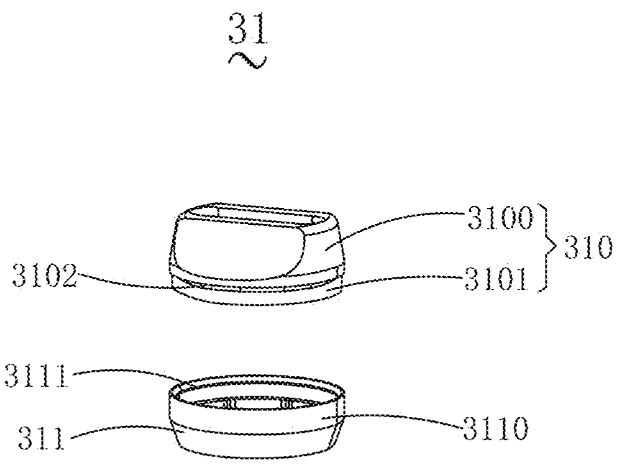
FIG. 3 is an exploded view of the fixing portion of the connector provided by the first embodiment of the present disclosure.

Please refer to FIGS. 1 to 3. A first embodiment of the present disclosure provides a connector 1, including a first electrical connection structure 3 and a second electrical connection structure 4 that can be relatively rotated and are electrically connected. The first electrical connection structure 3 includes an electrical connection body 30 and a fixing portion 31. The electrical connection body 30 includes a plug 300 and a first conductive board 301 which are electrically connected. The fixing portion 31 includes a connecting member 310 and a sleeve member 311. The first conductive board 301 is disposed inside the connecting member 310, and the plug 300 exposes the connecting member 310. The sleeve member 311 is sleeved with the first electrical connection structure 3 and the second electrical connection structure 4, and at least the second electrical connection structure 4 is rotatably connected to the sleeve member 311. The connecting member 310 is at least partially received within the sleeve member 311.

It can be understood that the electrical connection structure 3 and the subsequent electrical connection structure 4 within the rotary connection facilitate enhanced flexibility and adaptability of the connector 1 across diverse operational settings, which also reinforces the connector's resilience to frequent connection and disconnection processes, thereby augmenting its longevity and overall durability.

The fixing portion 31 includes a connecting member 310 and a sleeve member 311, which are used to secure the electrical connection body 30 and protect the first conductive board 301 and other structures thereof. One end of the plug 300 is electrically connected to the first conductive board 301, and the other end thereof exposes the connecting member 310 for connecting to the plug interface of external electronic device to implement operations such as data transmission and charging. The plug 300 is fixedly connected to the fixing portion 31 through the first conductive board 301. Thus, the plug 300 can be prevented from being separated from the second electrical connection structure 4, which can provide a reliable electrical connection and ensure the stability and efficiency of data or power transmission.

It can be understood that the sleeve member 311 sleeves the first electrical connection structure 3 and the second electrical connection structure 4, and at least the second electrical connection structure 4 is rotatably connected to the sleeve member 311. Thus, on the premise that the first electrical connection structure 3 and the second electrical connection structure 4 can be rotated 360°, it is ensured that the first electrical connection structure 3 and the second electrical connection structure 4 are firmly connected and difficult to separate. The connecting member 310 is at least partially received in the sleeve 311, which increases the stability and safety of the connection between the two, prevents components from loosening after frequent rotation or bending of the connector 1, prevents accidental loosening or disconnection, and reduces the risk of damage to the connector 1.

Specifically, in this embodiment, the connecting member 310 is disposed at an end away from the second electrical connection structure 4. The sleeve member 311 is a hollow structure. The sleeve member 311 and the connecting member 310 form a cavity, and part of the second electrical connection structure 4 is accommodated in the cavity.

It can be understood that the connecting member 310 and the sleeve member 311 make the installation and assembly of the connector 1 more convenient, protect the first conductive board 301 and other structures, and increase the stability of the internal structure thereof.

Further, the connecting member 310 includes a wrapping portion 3100 that partially wraps around the plug 300 and a docking portion 3101 located on the side of the wrapping portion 3100 away from the plug 300. A discontinuous gap 3102 is provided between the end of the docking portion 3101 close to the wrapping portion 3100 and the wrapping portion 3100, and a hooking portion 3110 is provided at one end of the sleeve member 311 facing the connecting member 310. The interior of the hooking portion 3110 is provided with a inverted hook 3111. When the connecting member 310 is connected to the sleeve member 311, the hooking portion 3110 wraps around the docking portion 3101, and the inverted hook 3111 enters the gap 3102.

It can be understood that the combination of the inverted hook 3111 and the discontinuous gap 3102 can lock the connecting member 310 and the sleeve member 311 tightly, further improving the connection stability thereof, and preventing the connecting member 310 and the sleeve member 311 from loosening or falling off after frequent rotation and multiple uses.

Further, the edge of the first conductive board 301 is provided with a glue-receiving notch 3010, a glue-receiving space is formed between the glue-receiving notch 3010 and the inner wall of the fixing portion 31, and the gap 3102 is communicated with the glue-receiving notch 3010.

It can be understood that the edge of the first conductive board 301 without the glue-receiving notch 3010 abuts against the inner wall of the connecting member 310, and a glue-receiving space is formed between the glue-receiving notch 3010 and the inner wall of the fixing portion 31. Thus, glue can more fully bond the electrical connection body 30 and the fixing portion 31, making the connection between the two more tight and stable, and avoiding the loosening and detachment of the electrical connection body 30 caused by frequent rotation or multiple bending. The gap 3102 is communicated with the glue-receiving notch 3010, which enables the glue to synchronously bond the connecting member 310 and the sleeve member 311 of the fixing portion 31. Additionally, the reliability of the connection between the connecting member 310 and the sleeve member 311 and the reliability of the connection between the electrical connection body 30 and the fixing portion 31 are improved, and the manufacturing process thereof is reduced.

Figure 4:
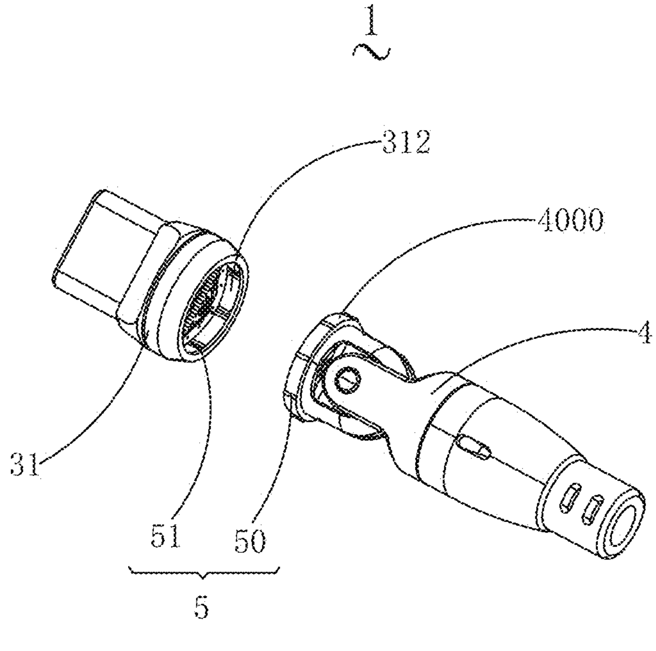
FIG. 4 is another exploded view of the connector provided by the first embodiment of the present disclosure.

Please refer further to FIG. 4. The inner wall of one end of the fixing portion 31 away from the plug 300 is provided with an annular groove 312. The end of the second electrical connection structure 4 close to the first electrical connection structure 3 is provided with a protrusion 4000 that matches the annular groove 312. The protrusion 4000 cooperates with the annular groove 312 to achieve rotational connection therebetween.

It can be understood that the first electrical connection structure 3 and the second electrical connection structure 4 can achieve 360° rotation through the combination of the annular groove 312 and the protrusion 4000. The process of the protrusion 4000 and the annular groove 312 is simple and reliable, ensuring that the first electrical connection structure 3 and the second electrical connection structure 4 are not easily separated while achieving rotational connection, and preventing the loss of the first electrical connection structure 3.

Further, at least one set of limiting structures 5 corresponding to the annular groove 312 and the protrusion 4000 are provided, which are configured to control the relative rotation angle between the first electrical connection structure 3 and the second electrical connection structure 4 to any angle between 0° and 360°.

Further, the limiting structure 5 is configured to control the relative rotation angle between the first electrical connection structure 3 and the second electrical connection structure 4 to be one of 90°, 120°, 180°, or 270°.

Specifically, in this embodiment, the limiting structure 5 is composed of a limiting groove 51 disposed on the inner wall of the annular groove 312 and a limiting protrusion 50 disposed on the outer wall of the protrusion 4000. During the rotation operation, the limiting groove 51 and the limiting protrusion 50 cooperate with each other to control the relative rotation angle between the first electrical connection structure 3 and the second electrical connection structure 4, such that when they rotate to an appropriate angle, relative rotation no longer occurs, ensuring the stability of the connection and facilitating use.

Optionally, as another implementation, the limiting structure 5 can also be composed of a limiting protrusion 50 disposed on the inner wall of the annular groove 312 and a limiting groove 51 disposed on the outer wall of the protrusion 4000. The limiting structure 5 of this arrangement has the same technical effect as the above, and will not be repeated here.

It can be understood that the rotation angle can be adjusted by arranging the position and number of the limiting structures 5. Multiple sets of limiting structures 5 can be uniformly arranged on the annular groove 312 and the protrusion 4000, or unevenly arranged on the annular groove 312 and the protrusion 4000, so as to achieve any relative rotation angle between 0° and 360° between the first electrical connection structure 3 and the second electrical connection structure 4.

For example, one, two, or three sets of limiting structures 5 can be uniformly arranged on the annular groove 312 and protrusion 4000, achieving a relative rotation angle of 360°, 180°, or 120° between the first electrical connection structure 3 and the second electrical connection structure 4.

For example, two sets of limiting structures 5, oppositely disposed, can be arranged corresponding to the annular groove 312 and the protrusion 4000. After the first electrical connection structure 3 and the second electrical connection structure 4 rotate 180° relative to each other, the limiting groove 51 and the limiting protrusion 50 of the limiting structure 5 cooperate to limit the position therebetween. In this case, the first electrical connection structure 3 and the second electrical connection structure 4 will not rotate relative to each other when not subjected to external force.

Figure 5:
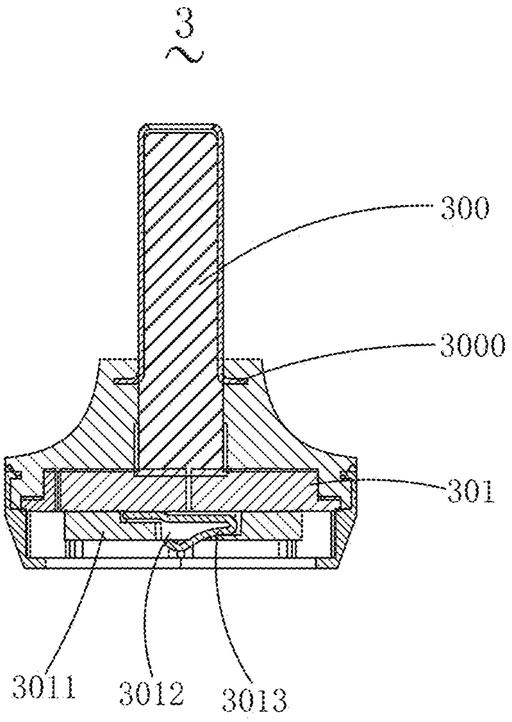
FIG. 5 is a cross-sectional view of the first electrical connection structure of the connector provided by the first embodiment of the present disclosure.

Please refer further to FIG. 5. One end of the plug 300 connected to the wrapping portion 3100 is provided with a flipping structure 3000. When the user rotates the connector 1, the plug 300 may be subjected to force, and the flipping structure 3000 makes the plug 300 more firmly connected to the wrapping portion 3100, preventing the plug 300 from loosening and falling off to affect the performance of the connector.

In some specific embodiments, the plug 300 includes any one of the type-C plug, micro USB plug, or lighting plug.

Further, one side of the first conductive board 301 away from the plug 300 is provided with a support plate 3011 and a metal spring piece 3013. The support plate 3011 is provided with a through hole 3012 corresponding to the metal spring piece 3013, and the metal spring piece 3013 extends from the through hole 3012.

It can be understood that multiple metal spring pieces 3013 are arranged on the same horizontal plane, and the two ends of the clastic direction of the multiple metal spring pieces 3013 are respectively connected to the first conductive board 301 and the second electrical connection structure 4, thereby achieving electrical connection between the first electrical connection structure 3 and the second electrical connection structure 4. The metal spring pieces 3013 are less prone to poor contact or deviation, which can improve the reliability of signal transmission.

It can be understood that by providing the support plate 3011, it is possible to further avoid poor contact caused by plastic deformation of the metal spring pieces 3013 due to excessive compression. The metal spring pieces 3013 and the through holes 3012 are arranged in one-to-one correspondence, which can prevent the metal spring pieces 3013 from mistakenly contacting each other and causing signal crosstalk.

Figure 6:
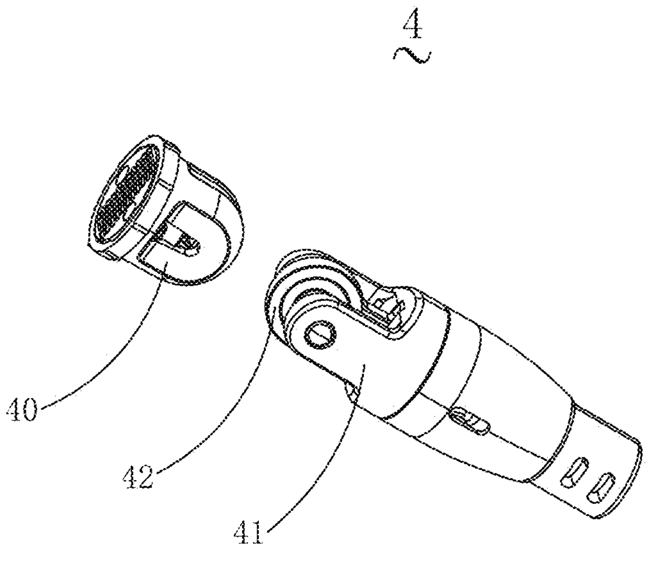
FIG. 6 is an exploded view of the second electrical connection structure of the connector provided by the first embodiment of the present disclosure.
Figure 7:
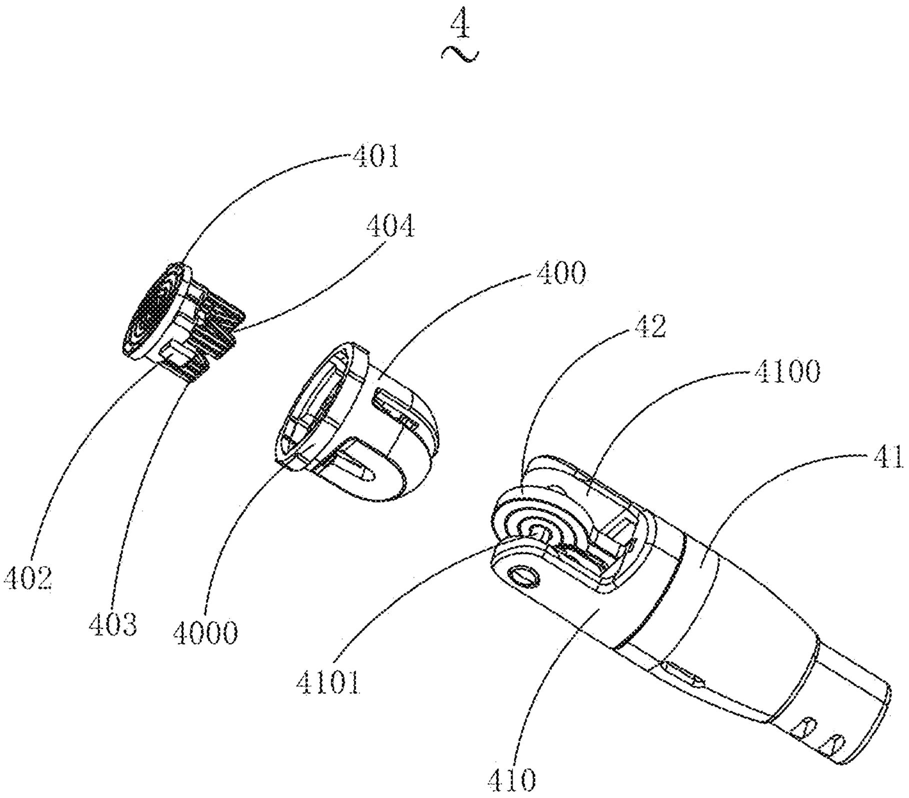
FIG. 7 is another exploded view of the second electrical connection structure of the connector provided by the first embodiment of the present disclosure.

Further, please refer to FIGS. 6 and 7. The second electrical connection structure 4 includes a rotating portion 40, which includes a housing 400 with a protrusion 4000, a second conductive board 401 located inside the housing 400, and an elastic terminal 403 electrically connected to one side of the second conductive board 401 away from the first electrical connection structure 3.

It can be understood that the housing 400 is of a hollow structure, which provides protection for the second conductive board 401 and the elastic terminal 403 accommodated therein. Moreover, the protrusion 4000 disposed on the housing 400 is matched with the annular groove 312 provided on the inner wall of the fixing portion 31 to achieve rotational connection between the first electrical connection structure 3 and the second electrical connection structure 4.

Further, the housing 400 is integrally formed, which increases the reliability of cooperating the protrusion 4000 on the housing 400 with the annular groove 312, reduces the production process, increases the output, and can be mass produced with the same mold, greatly reducing the production cost.

Further, the second electrical connection structure 4 further includes a plastic member 402 located on one side of the second conductive board 401 facing the elastic terminal 403. The same group of elastic terminals 403 pass through the same plastic member 402 to be fixedly connected to the second conductive board 401.

It can be understood that due to the large number of elastic terminals 403 and the limited space to accommodate elastic terminals 403, it is required that the diameter of the elastic terminal 403 be reduced, which further weakens the strength of the elastic terminal 403. By providing the plastic member 402 to strengthen the connection between the elastic terminal 403 and the second conductive board 401, the elastic terminal 403 can be prevented from tilting during rotation.

Specifically, in this embodiment, the number of the plastic member 402 is two, which corresponds to two sets of elastic terminals 403, and the two plastic members 402 are fixed by insertion.

Please refer to FIGS. 8 to 11. The elastic terminals 403 are arranged in two opposite groups, each group including at least 6 elastic terminals 403. The elastic terminals 403 in the same group include at least charging terminals 4032, data terminals 4033, and/or signal terminals 4034.

Further, the second electrical connection structure 4 further includes a connecting base 41 and an adapter plate 42 arranged on the connecting base 41. The two sets of elastic terminals 403 form a plugging space 404 therebetween, and the adapter plate 42 is inserted into the plugging space 404 to electrically connect to the elastic terminals 403.

It can be understood that the adapter board 42 and the elastic terminal 403 are electrically contacted to implement charging and/or data transmission functions.

Further, the elastic terminals 403 are provided with contacts 4031 and are electrically connected to the adapter plate 42 through the contacts 4031. Every two contacts 4031 of the same group of elastic terminals 403 are located in concentric circles.

Specifically, in this embodiment, an annular contact circuit 420 is provided on the adapter plate 42, and the annular contact circuit 420 is provided on two opposite surfaces of the adapter plate 42. Two elastic terminals 403 with two contacts 4031 in the same group located on concentric circles can be electrically connected to the same annular contact circuit 420, thereby enabling the two elastic terminals 403 to transmit the same signal and increasing the reliability of data transmission.

Specifically, in this embodiment, a group of elastic terminals is further subdivided into two corresponding parts, each of which includes at least a corresponding set of charging terminals 4032, data terminals 4033, and/or signal terminals 4034. The charging terminal 4032 is provided with a charging-terminal contact 40320, the data terminal 4033 is provided with a data-terminal contact 40330, and the signal terminal 4034 is provided with a signal-terminal contact 40340. Correspondingly, the charging-terminal contacts 40320, data-terminal contacts 40330, and/or signal-terminal contacts 40340 of the two parts are located on the same concentric circle, respectively, to ensure that two elastic terminals 403 of the same type transmit the same signal and increase the reliability of data transmission.

For example, every two contacts of charging terminal 4032 in the same group are located on a concentric circle, every two contacts of data terminal 4033 are located on a concentric circle, and every two contacts of signal terminal 4034 are located on a concentric circle. Therefore, the two charging terminals 4032 can be electrically connected to the same annular contact circuit 420 to transmit power signals and increase the reliability of the power transmission thereof. Two data terminals 4033 can be electrically connected to the same annular contact circuit 420 and transmit data signals simultaneously, thereby increasing the reliability of data transmission. The two signal terminals 4034 can be electrically connected to the same annular contact circuit 420, thereby achieving simultaneous transmission of the same signal and increasing the reliability of signal transmission.

It can be understood that according to the needs of different types of elastic terminals 403, corresponding annular contact circuit 420 needs to be provided. The contact circuit 420 is electrically connected to the contact 4031 of the elastic terminal 403 to achieve charging and/or data transmission.

Optionally, in some specific embodiments, both opposite sides of the adapter board 42 are provided with a first annular contact circuit 4200, a second annular contact circuit 4201, a third annular contact circuit 4202, and a fourth annular contact circuit (not indicated). The first annular contact circuits 4200 disposed on opposite sides of the adapter board 42 are insulated, and the electrical signals thereof are "V+" and "V−" respectively. The charging-terminal contacts 40320 of the charging terminals 4032 of the two sets of elastic terminals 403 are respectively in electrical contact with the first annular contact circuits 4200 on opposite sides of the adapter plate, thereby realizing the charging function.

When data transmission is required, each first annular contact circuit 4200 and each second annular contact circuit 4201 are insulated from each other. The first annular contact circuit 4200 and the second annular contact circuit 4201 are insulated from each other. The electrical signals of the first annular contact circuit 4200 and the second annular contact circuit 4201 are defined as "V+" and "V−", "D+" and "D−", respectively. The charging-terminal contacts 4032 of the two sets of elastic terminals 403 are respectively in electrical contact with the first annular contact circuit 4200 on opposite sides of the adapter board, and the data-terminal contacts 40330 of the data terminal 4033 of the two sets of elastic terminals 403 are respectively in electrical contact with the second annular contact circuit 4201 on opposite sides of the adapter board 42 to achieve data transmission function.

When the number of annular contact circuits 420 is more than 2 and they are arranged on opposite sides of the adapter plate 42, different transmission signals can be set according to the needs of the elastic terminals 403 corresponding to different products to achieve signal transmission and other functions.

Figure 12:
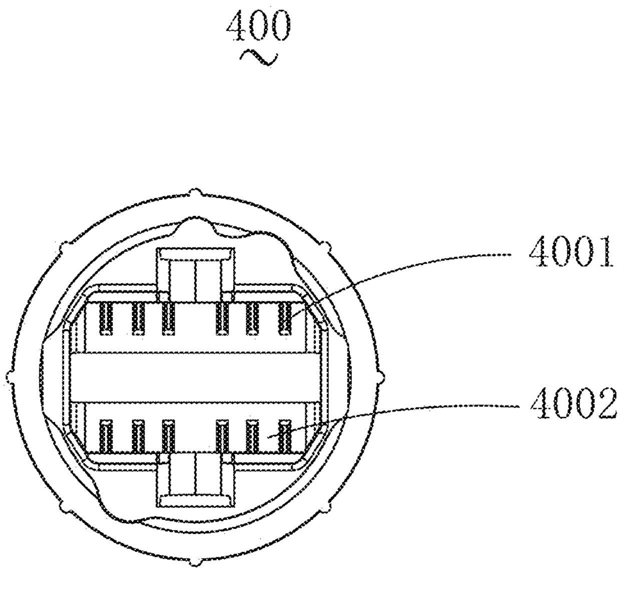
FIG. 12 is a front view of the housing of the connector provided by the first embodiment of the present disclosure.

Please further refer to FIG. 12. Spacer blocks 4001 are provided in the housing 400, and every two spacer blocks 4001 form a spacer gap 4002. The ends of the elastic terminals 403 away from the second conductive board 401 respectively extend into corresponding spacer gaps 4002. The spacer block 4001 is provided to prevent the elastic terminal 403 from being distorted during rotation and ensure the stability of the electrical connection between the elastic terminal 403 and the second electrical connection structure 4.

Figure 8:
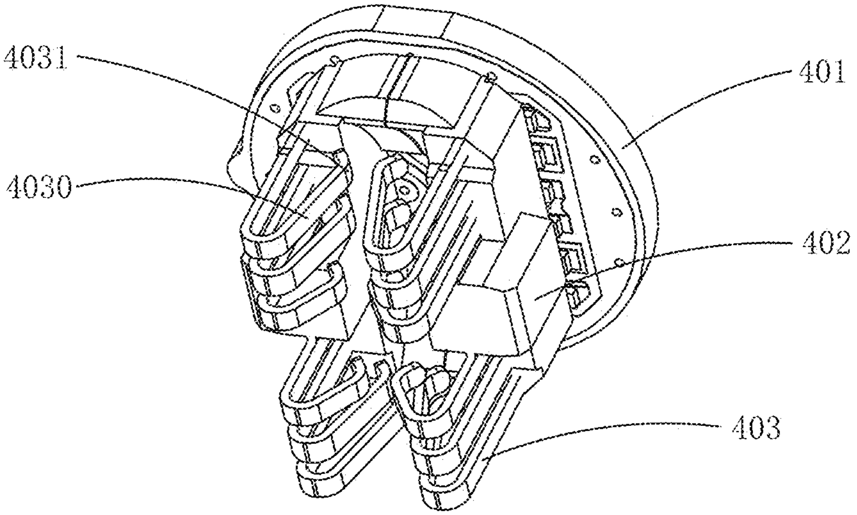
FIG. 8 is a perspective view of a partial structure of the second electrical connection structure of the connector provided by the first embodiment of the present disclosure.
Figure 9:
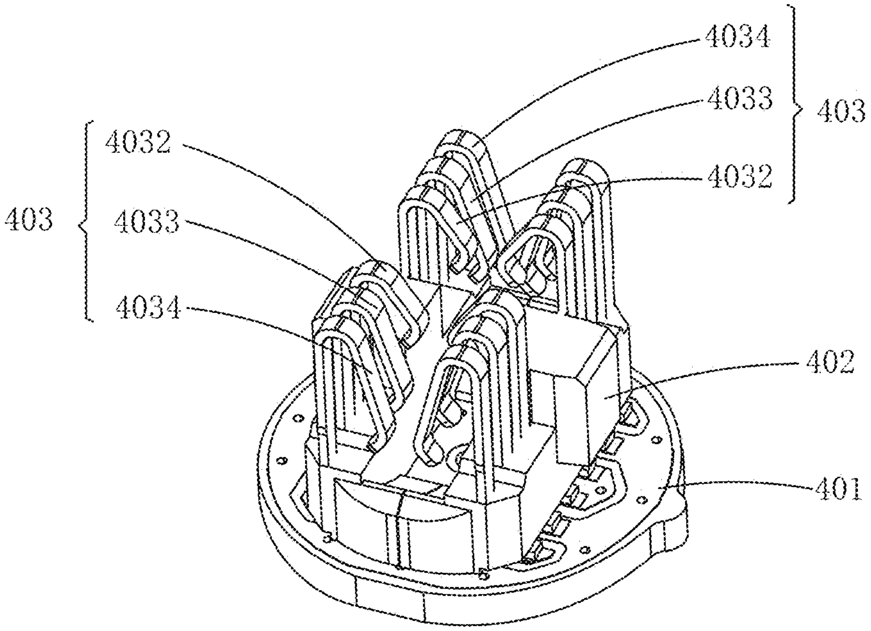
FIG. 9 is another perspective view of a partial structure of the second electrical connection structure of the connector provided by the first embodiment of the present disclosure.
Figure 10:
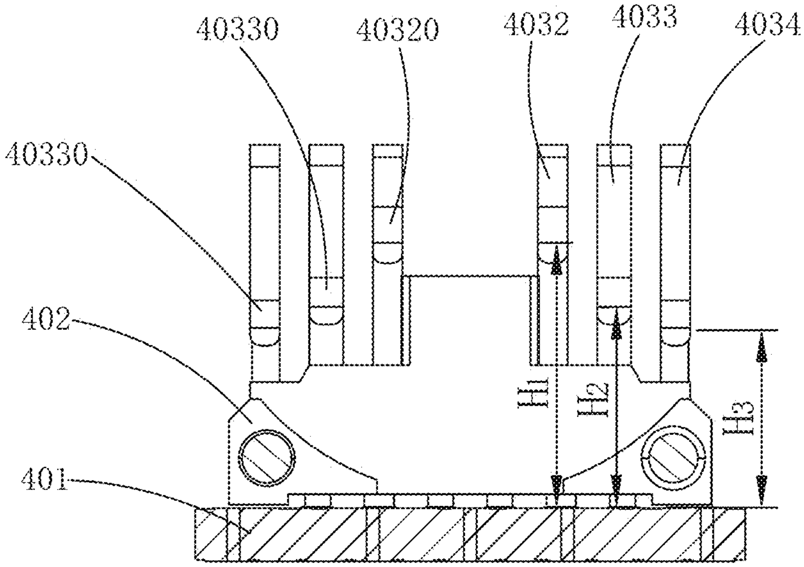
FIG. 10 is a cross-sectional view of a partial structure of the second electrical connection structure of the connector provided by the first embodiment of the present disclosure.
Figure 11:
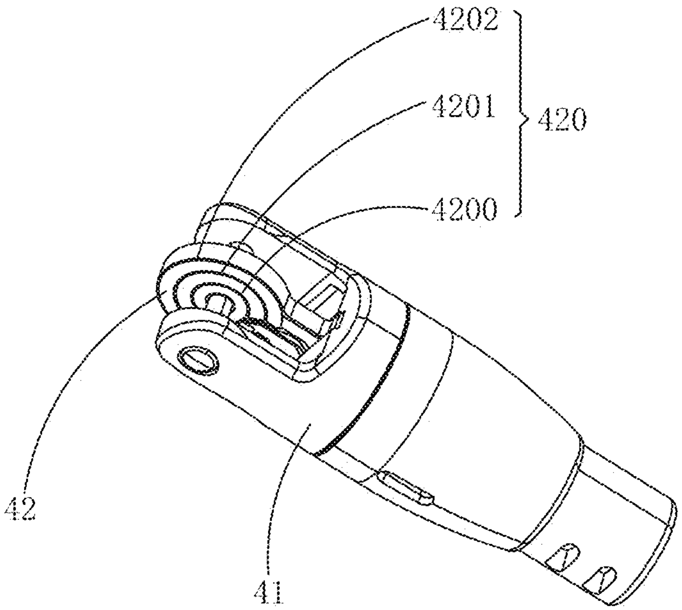
FIG. 11 is a perspective view of the connecting base and the adapter plate of the connector provided by the first embodiment of the present disclosure.

Please refer to FIGS. 8 to 10. The clastic terminal 403 includes a bending section 4030, and the contacts 4031 are arranged on the bending section 4030. The heights of the contacts 4031 of the elastic terminals 403 of different types in the same group in the direction perpendicular to the second conductive board 401 are different.

It can be understood that the contact 4031 of different types of elastic terminals 403 in the same group has different heights in the direction perpendicular to the second conductive board 401, which can increase the distance between the contacts of adjacent clastic terminals 403, avoiding crosstalk caused by slight tilting during use.

In some specific embodiments, the height of the charging-terminal contact 40320 of the charging terminal 4032 perpendicular to the direction of the second conductive board 401 is H1 (as shown in FIG. 10), the height of the data-terminal contact 40330 of the data terminal 4033 perpendicular to the direction of the second conductive board 401 is H2 (as shown in FIG. 10), and the height of the signal-terminal contact 40340 of the signal terminal 4034 perpendicular to the direction of the second conductive board 401 is H3 (as shown in FIG. 10). H1, H2, and H3 have different heights, such that the charging-terminal contact 40320, the data-terminal contact 40330, and the signal-terminal contact 40340 can fully contact the corresponding contact circuits, and crosstalk will not occur due to slight skew.

It can be understood that the contacts 4031 are provided on the bending section 4030. Since the heights of each contact 4031 in the direction perpendicular to the second conductive board 401 are different, the bending degree of the bending section 4030 of each elastic terminal 403 should also be different to better make electrical contact with the contact circuit on the adapter board 42.

Further, please refer to FIG. 7. The connecting base 41 is provided with a clamping plate 410, which includes clamping arms 4100 located on opposite sides of the thickness direction of the adapter plate 42 and a rotating shaft 4101 that connects the clamping arm 4100, the adapter plate 42 and the housing 400. The connecting base 41 is rotatably connected to the rotating portion 40 through the rotating shaft 4101. The plane in which the rotation direction of the connecting base 41 and the rotating portion 40 is located and the plane in which the first electrical connection structure 3 and the second electrical connection structure 4 rotate relative to each other are different planes in the same space.

It can be understood that the clamping plate 410 can effectively protect the adapter plate 42 and reduce the risk of the adapter plate 42 breaking when the clamping plate 410 is subjected to a force along its thickness direction.

Figure 13:
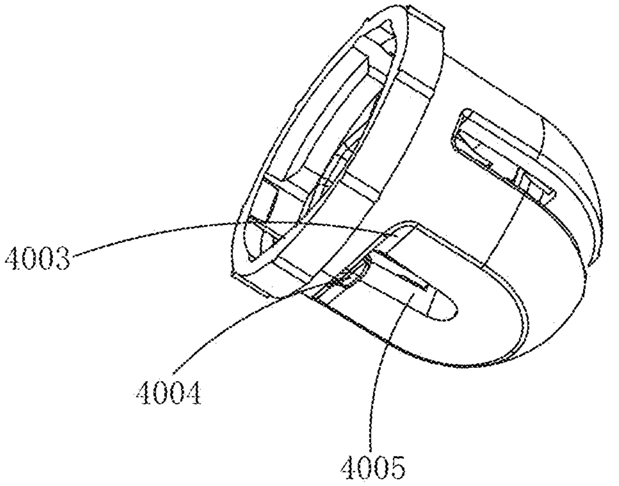
FIG. 13 is a perspective view of the housing of the connector provided by the first embodiment of the present disclosure.

Please further refer to FIG. 13. Both sides of the housing 400 are provided with giving-way steps 4003 and giving-way holes 4005. A support boss 4004 is disposed on the giving-way step 4003, and both ends of the rotating shaft 4101 pass through the giving-way hole 4005 to connect the adapter plate 42 and the clamping arm 4100. The support boss 4004 abuts against the top of the clamping arm 4100.

It can be understood that the housing 400 is sleeved to the two clamping arms 4100, and the rotating shaft 4101 runs through the center of the adapter plate 42, and then passes through the giving-way hole 4005 to connect the clamping arms 4100 and the housing 400. Therefore, by rotating the rotating shaft 4101, a rotational connection of at least 180° can be achieved between the rotating portion 40 and the connecting base.

It can be understood that the plane in which the rotation direction of the connecting base 41 and the rotating portion 40 is located and the plane in which the first electrical connection structure 3 and the second electrical connection structure 4 rotate relative to each other are different planes in the same space, which further increases the flexibility of the connector 1. For example, the plane of the rotation direction of the rotating portion 40 and the connecting base 41 is the vertical plane of the plane of relative rotation of the first electrical connection structure 3 and the second electrical connection structure 4, enabling the connector 1 to realize both relative rotation in the horizontal plane and rotation in the vertical plane, thereby increasing the flexibility and practicality of the connector 1.

It can be understood that the housing 400 and the clamping plate 410 are arranged on the outer side of the adapter plate 42, which increases the connection strength of the first electrical connection structure 3 and the second electrical connection structure 4, and improves the service life. Moreover, in this embodiment, the contact circuit on the adapter board 42 is configured to be circular, such that when the elastic terminal 403 and the adapter board 42 rotate relative to each other, the contact 4031 of the elastic terminal 403 can always maintain electrical connection with the adapter board 42, ensuring the stability of data transmission.

It can be understood that the giving-way hole 4005 is used to allow the rotating shaft 4101 to pass through and rotate, and the support boss 4004 is pressed against the top of the clamping arm 4100 to ensure that the housing 400 and the clamping plate 410 do not collapse after connection. In this embodiment, the specific shapes of the giving-way hole 4005 and the support boss 4004 is not limited.

Optionally, in some specific embodiments, the giving-way hole 4005 is a strip hole to facilitate the processing and installation of the rotating shaft 4101.

Figure 14:
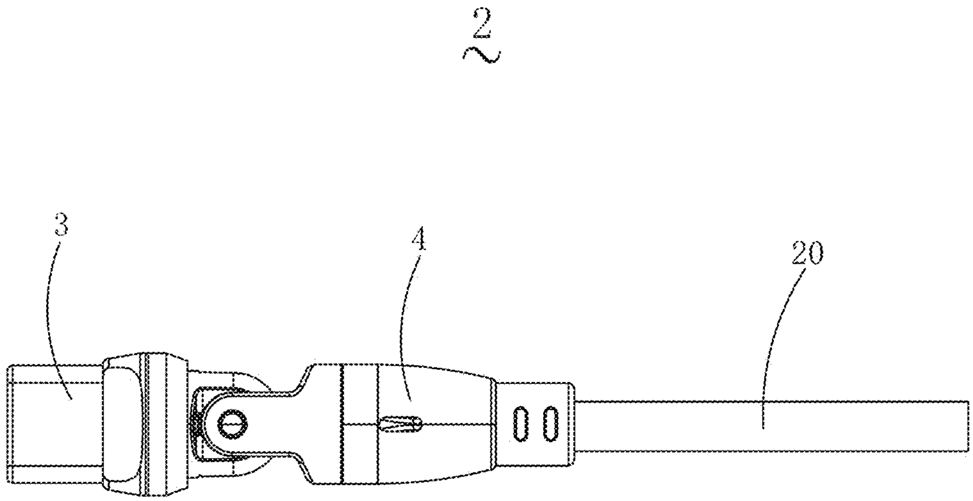
FIG. 14 is a schematic side view of a data cable provided by a second embodiment of the present disclosure.

Please refer to FIG. 14. A second embodiment of the present disclosure provides a data cable 2, including a wire body 20 and a connector 1. The connector 1 includes a first electrical connection structure 3 and a second electrical connection structure 4 that can relatively rotated and electrically connected. The first electrical connection structure 3 includes an electrical connection body 30 and a fixing portion 31, the electrical connection body 30 includes a plug 300 and a first conductive board 301 that are electrically connected. The fixing portion 31 includes a connecting member 310 and a sleeve member 311, the first conductive board 301 is disposed in the connecting member 310, the connecting member 310 is exposed out of the plug 300, and the sleeve member 311 is sleeved to the first electrical connection structure 3 and the second electrical connection structure 4. At least the second electrical connection structure 4 is rotatably connected to the sleeve member 311, and the connecting member 310 is at least partially accommodated in the sleeve member 311. The wire body 20 is electrically connected to one or both of the first electrical connection structure 3 and the second electrical connection structure 4.

Further, the connecting member 310 includes a wrapping portion 3100 that at least partially wraps around the plug 300 and a docking portion 3101 located at one side of the wrapping portion 3100 away from the plug 300. A discontinuous gap 3102 is provided between the wrapping portion 3100 and one end of the docking portion 3101 close the wrapping portion 3100. A hooking portion 3110 is provided at one end of the sleeve member 311 facing the connecting member 310, and an interior of the hooking portion 3110 is provided with a inverted hook 3111. When the connecting member 310 is connected to the sleeve member 311, the hooking portion 3110 wraps around the docking portion 3101, and the inverted hook 3111 enters the gap 3102.

Further, the edge of the first conductive board 301 is provided with a glue-receiving notch 3010, a glue-receiving space is formed between the glue-receiving notch 3010 and the inner wall of the fixing portion 31, and the gap 3102 is communicated with the glue-receiving notch 3010.

Further, the inner wall of one end of the fixing portion 31 away from the plug 300 is provided with an annular groove 312, and a protrusion 4000 matching the annular groove 312 is disposed at one end of the second electrical connection structure 4 close to the first electrical connection structure 3. The protrusion 4000 cooperates with the annular groove 312 to achieve rotational connection therebetween. At least one set of limiting structures 5 is disposed corresponding to the annular groove 312 and the protrusion 4000, and the limiting structure 4000 is configured to control the relative rotation angle between the first electrical connection structure 3 and the second electrical connection structure 4 to be one of 90°, 120°, 180°, or 270°.

It can be understood that the limiting structure 5 can also be used to control the relative rotation angle of the first electrical connection structure 3 and the second electrical connection structure 4 to any angle between 0° and 360°.

It can be understood that the data cable 2 includes all the beneficial effects of the connector 1, which will not be repeated here.

In the embodiments provided by the present disclosure, it should be understood that "B corresponding to A" means that B is associated with A, and B can be determined based on A. However, it should also be understood that determining B based on A does not mean determining B only based on A. B can also be determined based on A and/or other information.

It will be understood that reference throughout this specification to "one embodiment" or "an embodiment" means that a particular feature, structure, or characteristic associated with the embodiment is included in at least one embodiment of the disclosure. Thus, the appearances of "in one embodiment" or "in an embodiment" in various places throughout this specification are not necessarily referring to the same embodiment. Furthermore, the particular features, structures or characteristics may be combined in any suitable manner in one or more embodiments. Those skilled in the art should also know that the embodiments described in the specification are all optional embodiments, and the actions and modules involved are not necessarily necessary for the present disclosure.

Compared with the existing art, the connector and data cable provided in the embodiment of the present disclosure have the following beneficial effects.

The connector includes a first electrical connection structure and a second electrical connection structure that can rotate relatively and be electrically connected, making the use of the connector more flexible and adaptable to diverse usage environments. Moreover, the connector can withstand frequent connection and disconnection operations, increasing its durability and extending its service life. The first electrical connection structure includes an electrical connection body and a fixing portion. The electrical connection body includes a plug and a first conductive board that are electrically connected, and the fixing portion includes a connecting member and a sleeve member. The first conductive board is disposed inside the connecting member, and the plug exposes the connecting member. The fixing portion is used to fix the electrical connection body and protect the first conductive board and other structures. One end of the plug is electrically connected to the first conductive board, and the other end exposes the connecting member for connecting with external electronic devices to achieve data transmission, charging, and other operations. Thus, reliable electrical connections are provided to ensure the stability and efficiency of data or power transmission. The sleeve member is sleeved to the first electrical connection structure and the second electrical connection structure, and at least the second electrical connection structure is rotatably connected to the sleeve member. With this design, the connection between the first electrical connection structure and the second electrical connection structure is stable and not easily separated, while achieving a 360° rotation between the first electrical connection structure and the second electrical connection structure. The connecting member is at least partially received within the sleeve member, which increases the stability and safety of the connection between the two, prevents components from loosening after frequent rotation or multiple bends of the connector, prevents accidental loosening or disconnection, reduces the risk of connector damage, and makes installation and assembly of the connector more convenient.

A discontinuous gap is provided between the end of the docking portion close to the wrapping portion and the wrapping portion, and a hooking portion is provided at one end of the sleeve member facing the connecting member. The interior of the hooking portion is equipped with a inverted hook. When the connecting member is connected to the sleeve member, the hooking portion wraps around the docking portion and the inverted hook enters the gap. The cooperation of the inverted hook and the discontinuous gap can lock the connecting member and the sleeve member tightly, further improving the stability of the connection thereof and preventing them from loosening or falling off after frequent rotation and multiple uses.

The edge of the first conductive board is provided with a glue-receiving notch, and a glue-receiving space is formed between the glue-receiving notch and the inner wall of the fixing portion, allowing the glue to more fully bond the electrical connection body and the fixing portion, making the connection between the two more stable and avoiding the loosening of the electrical connection body caused by frequent rotation or multiple bending. The glue-receiving notch is communicated with the gap, which enables the glue to synchronously bond the connecting member and the sleeve member of the fixing portion, while improving the reliability of the connection between the connecting member and the sleeve member and the reliability of the connection between the electrical connection body and the fixing portion, and reducing the manufacturing process thereof.

The inner wall of one end of the fixing portion away from the plug is provided with an annular groove. The end of the second electrical connection structure close to the first electrical connection structure is provided with a protrusion that matches the annular groove. The protrusion cooperates with the annular groove to achieve rotational connection therebetween. The process of the protrusion and the annular groove is simple and reliable, ensuring that the first electrical connection structure and the second electrical connection structure are not easily separated while achieving rotational connection, and preventing the loss of the first electrical connection structure. At least one set of limiting structures corresponding to the annular groove and the protrusion are provided, which are configured to control the relative rotation angle between the first electrical connection structure and the second electrical connection structure to any angle between 0° and 360°. Thus, when the first electrical connection structure and the second electrical connection structure rotate to an appropriate angle, relative rotation thereof no longer occurs, ensuring the stability of the connection and facilitating use.

One end of the plug connected to the wrapping portion is provided with a flipping structure, which makes the plug more firmly connected to the wrapping portion, preventing the plug from loosening and falling off to affect the performance of the connector.

One side of the first conductive board away from the plug is provided with a support plate and a metal spring piece. The support plate is provided with a through hole corresponding to the metal spring piece, and the metal spring piece extends from the through hole. The metal spring piece is used to achieve electrical connection between the first electrical connection structure and the second electrical connection structure. The metal spring pieces are less prone to poor contact or deviation, which can improve the reliability of signal transmission. By providing the support plate, it is possible to further avoid poor contact caused by plastic deformation of the metal spring pieces due to excessive compression. The metal spring pieces and the through holes are arranged in one-to-one correspondence, which can prevent the metal spring pieces from mistakenly contacting each other and causing signal crosstalk.

The elastic terminals are arranged in two opposite groups, each group including at least 6 elastic terminals. The elastic terminals in the same group include at least charging terminals, data terminals, and/or signal terminals, which allows the connector to transmit a variety of different data to meet different needs of users. Every two contacts of the same group of elastic terminals are located in concentric circles, which ensures that two elastic terminals of the same type transmit the same signal and increases the reliability of data transmission.

The housing is integrally formed, which increases the reliability of cooperating the protrusion on the housing with the annular groove, reduces the production process, increases the output, and can be mass produced with the same mold, greatly reducing the production cost.

The plastic member and spacer blocks are provided to fix the two ends of the elastic terminal, prevent the elastic terminal from being skewed during rotation, and ensure the stability of the electrical connection between the elastic terminal and the second electrical connection structure.

The elastic terminal includes a bending section, and the contacts are arranged on the bending section. The contact of different types of elastic terminals in the same group has different heights in the direction perpendicular to the second conductive board, which can increase the distance between the contacts of adjacent elastic terminals, avoiding crosstalk caused by slight tilting during use. The height of each contact point is different, and the bending degree of the bending section thereof is also different, such that each contact point can better make electrical contact with the contact circuit on the adapter plate.

The connecting base is provided with a clamping plate, which includes clamping arms located on opposite sides of the thickness direction of the adapter plate and a rotating shaft that connects the clamping arm, the adapter plate and the housing. The connecting base is rotatably connected to the rotating portion through the rotating shaft. By rotating the rotating shaft, a rotational connection of at least 180° can be achieved between the rotating portion and the connecting base. The plane in which the rotation direction of the connecting base and the rotating portion is located and the plane in which the first electrical connection structure and the second electrical connection structure rotate relative to each other are different planes in the same space. For example, the plane of the rotation direction of the rotating portion and the connecting base is the vertical plane of the plane of relative rotation of the first electrical connection structure and the second electrical connection structure, increasing the flexibility and practicality of the connector.

Both sides of the housing are provided with giving-way steps and giving-way holes. A support boss is disposed on the giving-way step. The giving-way hole is used to allow the rotating shaft to pass through and rotate, and the support boss is pressed against the top of the clamping arm to ensure that the housing and the clamping plate do not collapse after connection.

In another embodiment of the present disclosure, a data cable is provided, including a wire body and a connector, where the connector includes a first electrical connection structure and a second electrical connection structure that can relatively rotated and electrically connected; the first electrical connection structure includes an electrical connection body and a fixing portion, the electrical connection body includes a plug and a first conductive board that are electrically connected; the fixing portion includes a connecting member and a sleeve member, the first conductive board is disposed in the connecting member, the connecting member is exposed out of the plug, and the sleeve member is sleeved to the first electrical connection structure and the second electrical connection structure; at least the second electrical connection structure is rotatably connected to the sleeve member, and the connecting member is at least partially accommodated in the sleeve member; the wire body is electrically connected to one or both of the first electrical connection structure and the second electrical connection structure. The data cable has the same beneficial effect as the connector above, and will not be further elaborated here.

The connector and data cable disclosed in the embodiments of the present disclosure have been introduced in detail above. Specific examples are used to illustrate the principles and implementation methods of the present disclosure. The description of the above embodiments is only used to help understand the method and its core idea of the present disclosure. For those of ordinary skill in the art, there will be changes in the specific implementation and application scope based on the idea of the present disclosure. In summary, the contents of this specification should not be construed as limitations of the present disclosure. Any modifications, equivalent substitutions and improvements made within the principles of the present disclosure should be included in the protection scope of the present disclosure.

The invention claimed is:

1. A connector, comprising a first electrical connection structure and a second electrical connection structure that can be relatively rotated and electrically connected; wherein the first electrical connection structure comprises an electrical connection body and a fixing portion, the electrical connection body comprises a plug and a first conductive board that are electrically connected, the fixing portion comprises a connecting member and a sleeve member, the first conductive board is disposed in the connecting member, the connecting member is exposed out of the plug, and the sleeve member is sleeved to the first electrical connection structure and the second electrical connection structure; at least the second electrical connection structure is rotatably connected to the sleeve member, and the connecting member is at least partially accommodated in the sleeve member; wherein the connecting member comprises a wrapping portion that at least partially wraps around the plug and a docking portion located at one side of the wrapping portion away from the plug; a discontinuous gap is provided between the wrapping portion and one end of the docking portion close the wrapping portion; a hooking portion is provided at one end of the sleeve member facing the connecting member, and an interior of the hooking portion is provided with a inverted hook; when the connecting member is connected to the sleeve member, the hooking portion wraps around the docking portion, and the inverted hook enters the gap.

2. The connector according to claim 1, wherein an edge of the first conductive board is provided with a glue-receiving notch, a glue-receiving space is formed between the glue-receiving notch and an inner wall of the fixing portion, and the gap is communicated with the glue-receiving notch.

3. The connector according to claim 1, wherein an inner wall of one end of the fixing portion away from the plug is provided with an annular groove, and a protrusion matching the annular groove is disposed at one end of the second electrical connection structure close to the first electrical connection structure; the protrusion cooperates with the annular groove to achieve rotational connection therebetween; at least one set of limiting structures is disposed corresponding to the annular groove and the protrusion, and the limiting structure is configured to control the relative rotation angle between the first electrical connection structure and the second electrical connection structure to be any angle between 0° and 360°.

4. The connector according to claim 3, wherein the limiting structure is configured to control the relative rotation angle between the first electrical connection structure and the second electrical connection structure to be one of 90°, 120°, 180°, or 270°.

5. The connector according to claim 1, wherein one end of the plug connected to the wrapping portion is provided with a flipping structure.

6. The connector according to claim 1, wherein a support plate and a metal spring piece are provided on one side of the first conductive board away from the plug, and the support plate is provided with a through hole, from which the metal spring piece extends, corresponding to the metal spring piece.

7. The connector according to claim 3, wherein the second electrical connection structure comprises a rotating portion, and the rotating portion comprises a housing provided with the protrusion, a second conductive board provided in the housing and an elastic terminal electrically connected to one side of the second conductive board away from the first electrical connection structure.

8. The connector according to claim 7, wherein the elastic terminals are arranged in two opposite groups, each group thereof comprising at least 6 elastic terminals, and the elastic terminals in a same group comprising at least a charging terminal, a data terminal, and/or a signal terminal.

9. The connector according to claim 7, wherein the second electrical connection structure further comprises a plastic member disposed at one side of the second conductive board facing the elastic terminal, and the elastic terminals in a same group are fixedly connected to the second conductive board through a same plastic member.

10. The connector according to claim 7, wherein spacer blocks are provided in the housing, and spacer gaps are formed between adjacent spacer blocks; one end of the elastic terminals away from the second conductive board respectively extends into corresponding spacer gaps.

11. The connector according to claim 7, wherein the second electrical connection structure further comprises a connecting base and an adapter plate disposed on the connecting base, a plugging space is formed between two groups of elastic terminals, and the adapter plate is inserted into the plugging space to be electrically connected to the elastic terminals.

12. The connector according to claim 11, wherein the elastic terminal is provided with a contact and electrically connected to the adapter plate through the contact, and the contacts of the elastic terminals in a same group are located on concentric circles.

13. The connector according to claim 12, wherein the elastic terminal comprises a bending section, the contact is disposed at the bending section, and the contacts of different types of elastic terminals in a same group have different heights in a direction perpendicular to the second conductive board.

14. The connector according to claim 11, wherein the connecting base is provided with a clamping plate, which comprises clamping arms arranged on opposite sides in a thickness direction of the adapter plate and a rotating shaft connecting the clamping arms, the adapter plate and the cover; the connecting base is rotatably connected to the rotating portion through the rotating shaft, and a plane in which a rotation direction of the connecting base and the rotating portion is located and a plane in which the first electrical connection structure and the second electrical connection structure rotate relative to each other are different planes in a same space.

15. The connector according to claim 14, wherein giving-way steps and giving-way holes are provided on both sides of the housing, and a support boss is disposed on the giving-way step; two ends of the rotating shaft pass through the giving-way holes to connect the adapter plate and the clamping arm, and the support boss abut against a top of the clamping arm.

16. A data cable comprising a wire body and a connector, wherein the connector comprises a first electrical connection structure and a second electrical connection structure that can relatively rotated and electrically connected; the first electrical connection structure comprises an electrical connection body and a fixing portion, the electrical connection body comprises a plug and a first conductive board that are electrically connected; the fixing portion comprises a connecting member and a sleeve member, the first conductive board is disposed in the connecting member, the connecting member is exposed out of the plug, and the sleeve member is sleeved to the first electrical connection structure and the second electrical connection structure; at least the second electrical connection structure is rotatably connected to the sleeve member, and the connecting member is at least partially accommodated in the sleeve member; the wire body is electrically connected to one or both of the first electrical connection structure and the second electrical connection structure; wherein the connecting member comprises a wrapping portion that at least partially wraps around the plug and a docking portion located at one side of the wrapping portion away from the plug; a discontinuous gap is provided between the wrapping portion and one end of the docking portion close the wrapping portion; a hooking portion is provided at one end of the sleeve member facing the connecting member, and an interior of the hooking portion is provided with a inverted hook; when the connecting member is connected to the sleeve member, the hooking portion wraps around the docking portion, and the inverted hook enters the gap.

17. The data cable according to claim 16, wherein an edge of the first conductive board is provided with a glue-receiving notch, a glue-receiving space is formed between the glue-receiving notch and an inner wall of the fixing portion, and the gap is communicated with the glue-receiving notch.

18. The data cable according to claim 16, wherein an inner wall of one end of the fixing portion away from the plug is provided with an annular groove, and a protrusion matching the annular groove is disposed at one end of the second electrical connection structure close to the first electrical connection structure; the protrusion cooperates with the annular groove to achieve rotational connection therebetween; at least one set of limiting structures is disposed corresponding to the annular groove and the protrusion, and the limiting structure is configured to control the relative rotation angle between the first electrical connection structure and the second electrical connection structure to be one of 90°, 120°, 180°, or 270°.

* * * * *